US008935135B2

(12) United States Patent
Ishikawa (10) Patent No.: US 8,935,135 B2
(45) Date of Patent: *Jan. 13, 2015

(54) ACCURATE DETERMINATION OF PARTICLE POSITIONED ON FREE SURFACE IN PARTICLE METHOD

(75) Inventor: Tatsuya Ishikawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,586

(22) Filed: Aug. 24, 2012

(65) Prior Publication Data

US 2013/0054206 A1     Feb. 28, 2013

Related U.S. Application Data

(63) Continuation of application No. 13/356,802, filed on Jan. 24, 2012.

(30) Foreign Application Priority Data

Jan. 31, 2011    (JP) .................................. 2011-018125

(51) Int. Cl.
    *G06F 7/60*           (2006.01)
    *G06F 17/10*         (2006.01)
    *G06F 17/50*         (2006.01)

(52) U.S. Cl.
    CPC ........ *G06F 17/5009* (2013.01); *G06F 2217/16* (2013.01)
    USPC .......................................................... 703/2

(58) Field of Classification Search
    None
    See application file for complete search history.

(56) References Cited

U.S. PATENT DOCUMENTS

| 7,430,500 B2 | 9/2008 | Lei et al. |
| 7,603,263 B2 | 10/2009 | Yamaguchi et al. |
| 2011/0172948 A1 | 7/2011 | Gotoh et al. |

FOREIGN PATENT DOCUMENTS

| JP | H064645 A | 1/1994 |
| JP | 1995-0334484 | 12/1995 |
| JP | 2003-0150651 | 5/2003 |
| JP | 2003331208 A | 11/2003 |
| JP | 2007164774 A | 6/2007 |

(Continued)

OTHER PUBLICATIONS

English Translation of WO 2010/032656.*

(Continued)

*Primary Examiner* — Omar Fernandez Rivas
*Assistant Examiner* — Bernard E Cothran
(74) *Attorney, Agent, or Firm* — Cantor Colburn LLP (57) ABSTRACT

Methods, an apparatus, and a computer program product for determining whether or not a particle belongs to free surface particles, in a calculation process of a particle method in which a continuum subjected to calculation analysis is collectively modeled with a free surface by a plurality of particles. One of the methods includes the steps of: determining whether any other particle exists within a predetermined range with respect to the particle by referencing to identification information stored in a memory, where the other particle belongs to the free surface, and storing in the memory near free surface identification information which is set as near free surface if the other particle belonging to the free surface exists and set as sufficiently inside if the other free surface particle belonging to the free surface does not exist.

4 Claims, 8 Drawing Sheets

(56) References Cited

FOREIGN PATENT DOCUMENTS

| | | |
|---|---|---|
| JP | 2008-0111675 | 5/2008 |
| JP | 2010-0146369 | 12/2008 |
| JP | 2009-0069929 | 4/2009 |
| JP | 2009-0069930 | 4/2009 |
| JP | 2009-0129138 | 6/2009 |
| JP | 2009134504 A | 6/2009 |
| JP | 2010-0072379 | 4/2010 |
| WO | WO2010032656 | 3/2010 |

OTHER PUBLICATIONS

Adams et al. "Adaptively Sampled Particle Fluids", 2007.*
Fang et al. "Improved SPH methods for simulating free surface flows of viscous fluids", Applied Numerical Mathematics 59 (2009) 251-271.*

* cited by examiner

ACCURATE DETERMINATION OF PARTICLE POSITIONED ON FREE SURFACE IN PARTICLE METHOD

CROSS-REFERENCE TO RELATED APPLICATION

This application is a continuation of and claims priority from U.S. application Ser. No. 13/356,802 filed on Jan. 24, 2012, which in turn claims priority under 35 U.S.C. §119 from Japanese Patent Application No. 2011-018125 filed on Jan. 31, 2011, the entire contents of both applications are incorporated herein by reference.

BACKGROUND OF THE INVENTION

1. Field of the Invention

The present invention relates to numerically analyzing a behavior of a continuum, such as a fluid, using a particle method. More particularly, it relates to accurately determining a particle positioned on a free surface among particles that approximately represent the continuum, such as the fluid.

2. Related Art

A particle method is a technique whereby a continuum is approximately represented by a group of a plurality of particles, an algebraic relational expression is defined between these particles so that the group of particles imitates a behavior of the continuum, and analysis is performed by numerical calculation. Put more generally, the continuum subjected to calculation analysis is collectively modeled with a free surface by the plurality of particles. The particle method has the advantages that mesh generation is unnecessary and also that even a large deformation of a fluid subjected to analysis can be easily handled.

Known particle methods for fluids include the SPH (Smoothed Particle Hydrodynamics) method that calculates a behavior of a compressible fluid by an explicit solution technique, the MPS (Moving Particle Semi-implicit) and the ISPH methods that calculate a behavior of an incompressible fluid by a semi-implicit solution technique. In a calculation process of a particle method for an incompressible fluid, a pressure of the fluid is calculated as a solution of Poisson's equation defined so as to reflect an incompressibility condition.

However, an unnatural disturbance included in the actually calculated pressure poses a significant problem for practical use of the particle method.

In order to calculate the pressure of the fluid as the solution of Poisson's equation, there is a need to determine whether or not a particle approximately representing the fluid is positioned on the free surface. Each particle determined as being positioned on the free surface undergoes a process of fixing the pressure at zero, which corresponds to a process of imposing a boundary condition on Poisson's equation.

However, the solution of Poisson's equation significantly varies depending on a difference in boundary condition. Accordingly, if the determination of whether or not a particle approximately representing the fluid is positioned on the free surface cannot be made accurately, an unnatural disturbance is caused in a pressure distribution calculated in the particle method.

In a most representative method for determining whether or not a particle (i) is positioned on the free surface, the determination is made according to whether or not a "particle number density" $n_i$ of the particle (i) satisfies the following expression (1) with reference to a fixed value $n_0$:

$$n_i < \beta n_0 \quad (1)$$

The particle number density $n_i$ is defined as a total sum of weights defined for other particles that exist within a predetermined range (re) with respect to the particle (i). $n_0$ is a reference particle number density, and $\beta$ is a constant less than 1 specified according to the model.

When incompressibility is strictly satisfied in the calculation process, a particle number density of a particle existing in the fluid matches the reference particle number density $n_0$. This determination method is based on the ground that, since no particle is positioned outside the fluid, a smaller number of particles influence the weight total sum calculation for the particle positioned on the free surface, resulting in a lower particle number density of the particle.

There are several other known threshold-based determination methods formulated based on the substantially same ground.

However, in such a threshold-based determination method, there is an instance where a particle (a particle inside the analysis object) other than the particle positioned on the free surface is erroneously determined as a free surface particle. This is largely because, in the actual calculation of the particle method, the particle number density of each particle positioned inside the fluid is not strictly held constant but has a deviation.

In particular, since in more than a few cases the particle number density of the particle positioned inside the fluid is lower than the particle number density of the particle that is supposed to be determined as being positioned on the free surface, there is a substantial difficulty in using this method alone.

A method for simultaneously taking particle distribution asymmetry into consideration rather than singly applying the threshold determination for the particle number density is also known. In this method, a numerical value that serves as a criterion of asymmetry in a distribution of other particles within a predetermined range with respect to one particle is defined, and a particle that is determined as asymmetrical as a result of the threshold-based determination using the numerical value and also determined as having a low particle number density is determined as a particle positioned on the free surface.

This determination method is based on the ground that, since no particle is positioned outside the fluid, not only the particle positioned on the free surface has a lower particle number density but also there is a deviation in a distribution of other particles around the particle. This method is publicly known as disclosed in International Patent Publication No. WO/2010/032656.

However, even in the case of using this determination method that takes asymmetry into consideration, the particle positioned on the free surface cannot always be accurately specified. For example, merely by rotating about one particle by an arbitrary angle while maintaining relative positional relationships of all particles and fixing a coordinate system, the numerical value used as the criterion of asymmetry for the particle changes.

This leads to such a situation where different determination results are obtained depending on circumstances when the same determination result should be obtained. Thus, it is difficult to set the threshold for the determination.

Besides, the determination result is significantly affected when the parameter used for the determination is changed, and in more than a few cases the determination method that takes asymmetry into consideration fails to effectively function per se.

Typically, in the case where a particle positioned inside the fluid is erroneously determined as being positioned on the free surface, a larger disturbance is caused in the calculated pressure distribution when the particle is positioned farther inside the fluid.

It can be understood from the above description that, as long as the conventional technique is used, it is impossible to fundamentally prevent such erroneous determination that causes a significant disturbance in the pressure distribution while properly determining the particle positioned on the free surface, even though the parameter such as the threshold is carefully set. Especially in the case of performing analysis by large-scale calculation using a large number of particles, a more serious situation arises, making it extremely difficult to realize high-accuracy analysis which is an intended purpose of large-scale calculation.

As described above, it is extremely difficult to accurately determine whether or not a particle is positioned on the free surface. This problem, however, is unavoidable when performing analysis that uses the particle method.

The practical use of the particle method is expected to be greatly facilitated if such a free surface determination method can be established that, while characterizing a particle positioned on the free surface by a simple index as in the conventional technique, can fundamentally prevent erroneous determination that a sufficiently inside particle is a free surface particle, which causes a particularly significant disturbance in pressure.

Japanese Unexamined Patent Publication No. H7-334484—mandatory publication at 18 months after filing date in Japan, but which has not been published yet is referenced herein.

SUMMARY OF THE INVENTION

One aspect of the invention includes a method for determining whether or not a particle belongs to free surface particles, in a calculation process of a particle method in which a continuum subjected to calculation analysis is collectively modeled with a free surface by a plurality of particles. The method includes the steps of: determining whether or not any other particle exists within a predetermined range with respect to the particle by referencing to free surface identification information stored in a memory in a previous time step in the calculation process, where the other particle belongs to the free surface, and storing in the memory, based on the determining step, near free surface identification information which receives a designation if the other particle belonging to the free surface exists and receives another designation if the other free surface particle belonging to the free surface does not exist, where the near free surface identification information is stored for reference in a subsequent time step.

Another aspect of the invention includes a method for determining whether or not a particle belongs to free surface particles, in a calculation process of a particle method in which a continuum subjected to calculation analysis is collectively modeled with a free surface by a plurality of particles. The method includes steps of: determining whether or not any other particle exists within a predetermined range with respect to the particle by referencing to free surface identification information stored in a memory in a previous time step in the calculation process, where the other particle belongs to the free surface, and storing in the memory, based on the determining step, near free surface identification information which is set one way if the other particle belonging to the free surface exists and which is set another way if the other free surface particle belonging to the free surface does not exist, where the near free surface identification information is stored for reference in a subsequent time step.

Yet another aspect of the invention includes an apparatus of determining whether or not a particle belongs to free surface particles, in a calculation process of a particle method in which a continuum subjected to calculation analysis is collectively modeled with a free surface by a plurality of particles. The apparatus includes: means for determining whether or not any other particle exists within a predetermined range with respect to the particle by referencing to free surface identification information stored in a memory in a previous time step in the calculation process, where the other particle belongs to the free surface, and means for storing, in the memory, based on the results of the determining means, near free surface identification information which is set as near free surface if the other particle belonging to the free surface exists and set as sufficiently inside if the other particle belonging to the free surface does not exist, where the near free surface identification information is stored for reference in a subsequent time step.

DETAILED DESCRIPTION OF THE PREFERRED EMBODIMENTS

In view of the background described above, the present invention has an object of accurately determining a particle positioned on a free surface of a fluid.

A method according to the present invention is a method for determining whether or not a particle (i) belongs to free surface particles, in a calculation process of a particle method (PM) in which a continuum subjected to calculation analysis is collectively modeled with a free surface by a plurality of particles, the method including: a step of determining whether or not any particle belonging to the free surface exists within a predetermined range (R) with respect to the particle (i), by referencing to free surface identification information stored in a memory in a previous time step in the calculation process; and a step of storing, in the memory, near free surface identification information which is set as "near free surface" in the case of determining that any particle belonging to the free surface exists and set as "sufficiently inside" in the case of determining that any particle belonging to the free surface does not exist in the step of determining, the near free surface identification information being stored for reference in a subsequent time step.

The present invention can also be realized as means for executing the process of each step, or a program for causing a computer to execute these steps.

The step of determining and the step of storing are performed for all of the plurality of particles of the continuum subjected to the calculation analysis.

The method further includes a step of storing, in the memory, free surface identification information which is set as "inside" in the case where the particle (i) is determined as sufficiently inside by referencing to the near free surface identification information stored in the memory, the free surface identification information being stored for reference in a subsequent time step.

The method further includes: a step of comparing a particle number density with a predetermined particle number density threshold, in the case where the particle (i) is determined as near free surface by referencing to the near free surface identification information stored in the memory; a step of storing, in the memory, free surface identification information which is set as "free surface" in the case where the particle number density is lower than the predetermined particle number density threshold in the step of comparing, the free surface identification information being stored for reference in a subsequent time step; and a step of storing, in the memory, free surface identification information which is set as "inside" in the case where the particle number density is not lower than the predetermined particle number density threshold in the step of comparing, the free surface identification information being stored for reference in a subsequent time step.

According to the present invention, it is possible to determine a free surface particle more accurately. Specific simulation results for comparison between the conventional technique and the present invention are shown by way of an example below.

Figure 1:
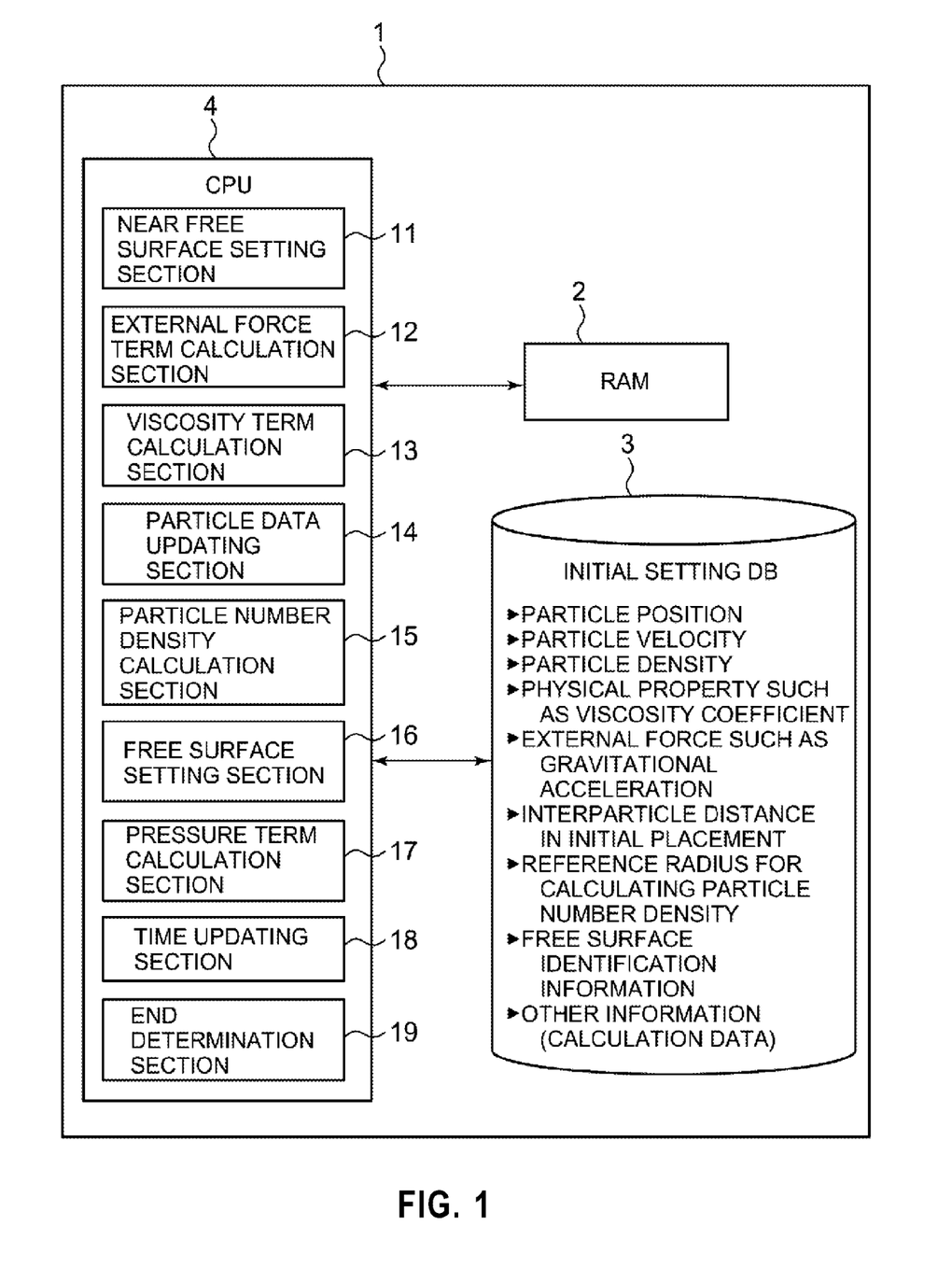
FIG. 1 is a schematic diagram showing a fluid analyzer according to an embodiment of the present invention.

FIG. 1 is a schematic diagram showing a fluid analyzer 1 for analyzing a behavior of a fluid using a particle method, where the fluid analyzer 1 includes a free surface particle determination apparatus according to the present invention. The fluid analyzer 1 includes a RAM (Random Access Memory) 2, an initial setting database (DB) 3, and a CPU (Central Processing Unit) 4, as main components.

The RAM 2 provides a working area for temporarily storing computer programs, such as an activation program of the fluid analyzer 1 and a fluid analysis program executed by the CPU 4, and various data.

The initial setting DB 3 stores various parameters necessary for executing fluid analysis according to the MPS method (in the case where the MPS method which is one type of particle method is taken as an example). In detail, the initial setting DB 3 as a memory stores calculation data necessary for the standard MPS method, including data related to a particle position, a particle velocity, a particle density, and a physical property such as a kinematic viscosity coefficient, data related to an external force such as gravitational acceleration, data related to an interparticle distance in initial placement, and data such as a reference radius for calculating a particle number density.

In addition, according to the embodiment of the present invention, the initial setting DB 3 stores free surface identification information indicating, for each particle constituting the fluid, whether or not the particle is positioned on a free surface.

The fluid analyzer 1 having a structure as hardware resources, a structure as software resources, or a structure that combines hardware resources and software resources as mentioned above executes a fluid analysis process. Software resources can be downloaded from outside, and can be provided as programs to be executed by a computer.

Figure 2A:
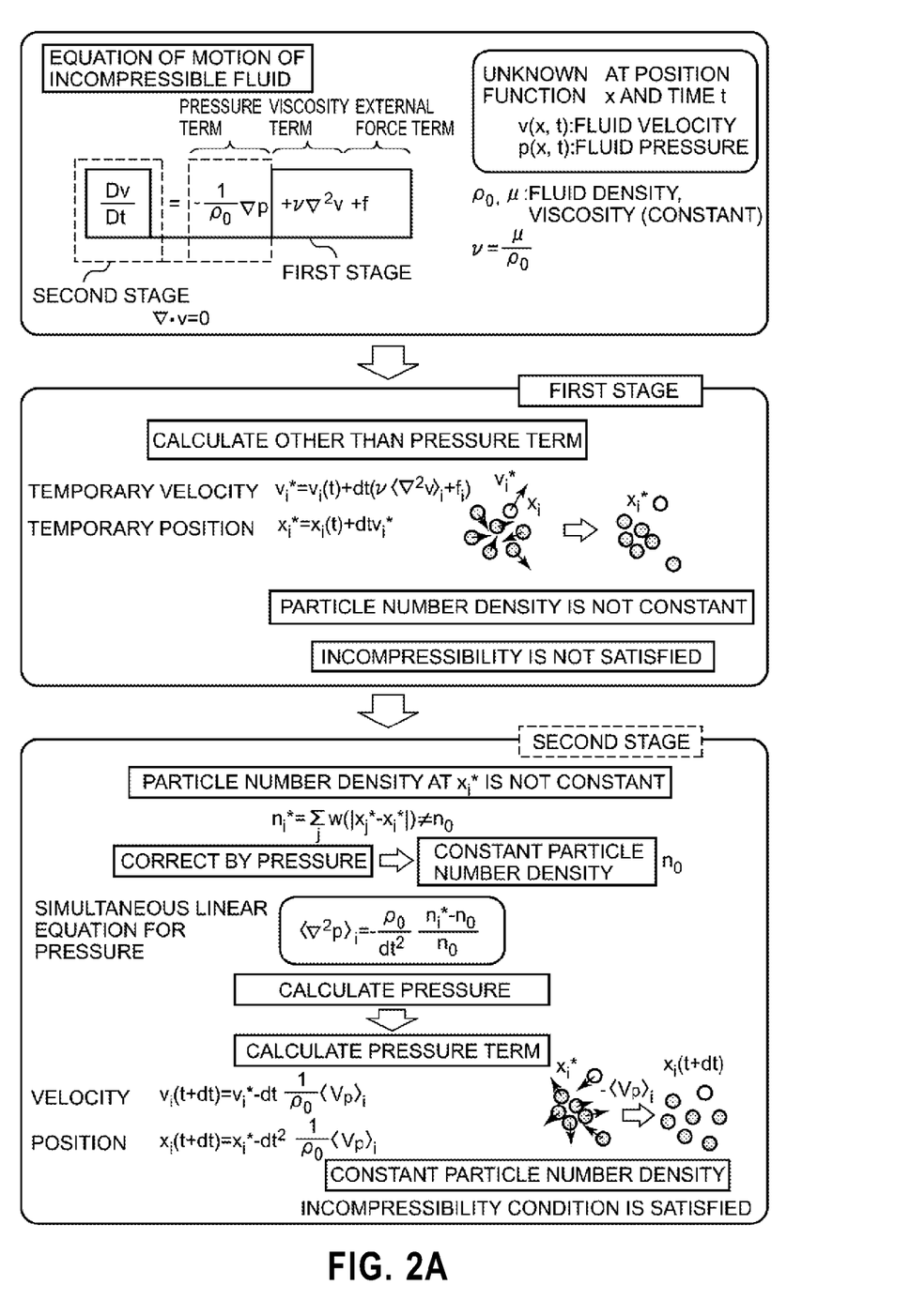
FIG. 2A is a diagram of an outline of a fluid analysis method for the MPS method as an exemplary particle method.
Figure 2B:
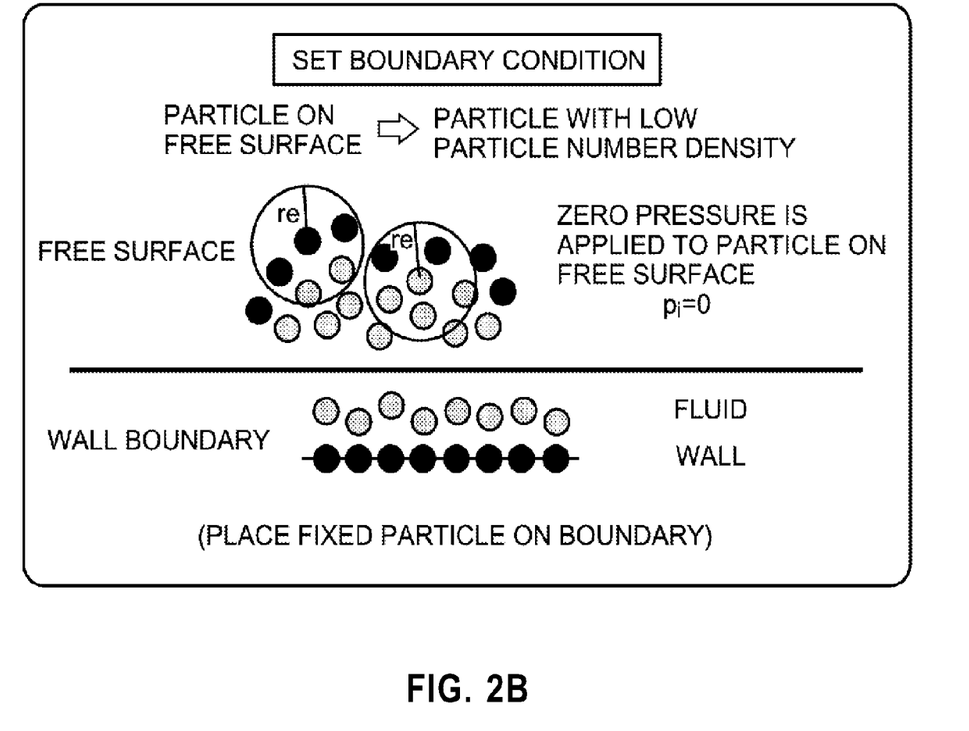
FIG. 2B is a diagram of an outline of a boundary condition setting.

FIG. 2A is a diagram explaining an outline of a fluid analysis method for the MPS method as an exemplary particle method. An equation of motion of an incompressible fluid is divided between first and second stages. FIG. 2B is a diagram explaining an outline of boundary condition setting. Processes shown in FIGS. 2A and 2B are already publicly known at the time of filing of the present application, and so their description is limited to brief description.

Figure 3:
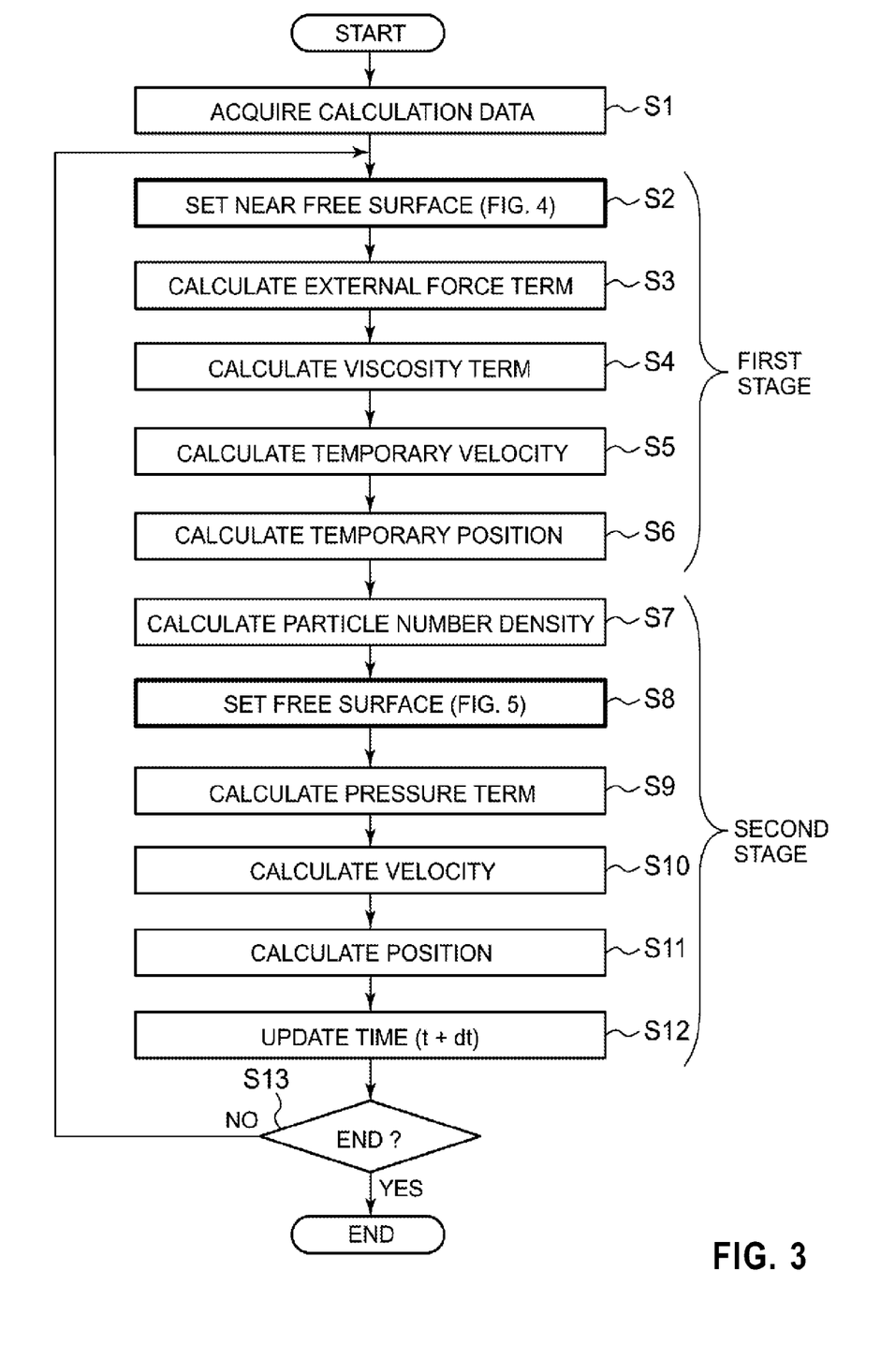
FIG. 3 is a flowchart showing a procedure of a fluid analysis method to which the present invention is partially applied, in a calculation process of a particle method (PM).

The following describes an operation of the fluid analyzer 1 in detail, with reference to a flowchart shown in FIG. 3. In the flowchart shown in FIG. 3, a fluid analysis process first goes to step S1. In step S1, the CPU 4 reads initial calculation data about the incompressible fluid subjected to analysis from the initial setting DB 3 into the RAM 2, thereby acquiring the initial calculation data.

In step S2, a near free surface setting section 11 performs a near free surface setting process. In this process, for a particle (i) or every particle, identification information "near free surface" is set in the case where it is determined that the particle is currently a free surface particle or a free surface particle exists within a predetermined range (R) with respect to the particle (i), and identification information "sufficiently inside" is set in the case where it is determined that no free surface particle exists within the predetermined range (R).

The term "sufficiently inside" is used merely to distinguish it from identification information "inside", and does not necessarily mean that the particle is positioned "sufficiently" inside a space of the actual calculation analysis object.

The identification information can be temporarily stored in the RAM 2 (or another memory) as near free surface identification information. The identification information is set for a particle or every particle. Accordingly, the identification information only needs to be retained in an array data retention format until the identification information is needed in order to simulate the behavior of the fluid in a process of proceeding with time steps of the calculation process, in the same manner where flow velocity information or position information is normally treated.

Step S2 is a process of limiting particles subjected to a subsequent free surface determination process to particles that belong to a near free surface, thereby preventing a sufficiently inside particle from being erroneously determined as a free surface particle. In fluid analysis time step development (t+dt), a step size of one time step (dt) is limited so as to achieve numerically stable calculation.

Since an entire shape of the fluid does not change significantly, a particle positioned inside the fluid sufficiently away from the free surface is unlikely to become a free surface particle by mere development of one time step (dt). Therefore, it is desirable that a particle determined as "sufficiently inside" at this stage is kept from being determined as a free surface particle in a subsequent boundary condition setting step.

Figure 4:
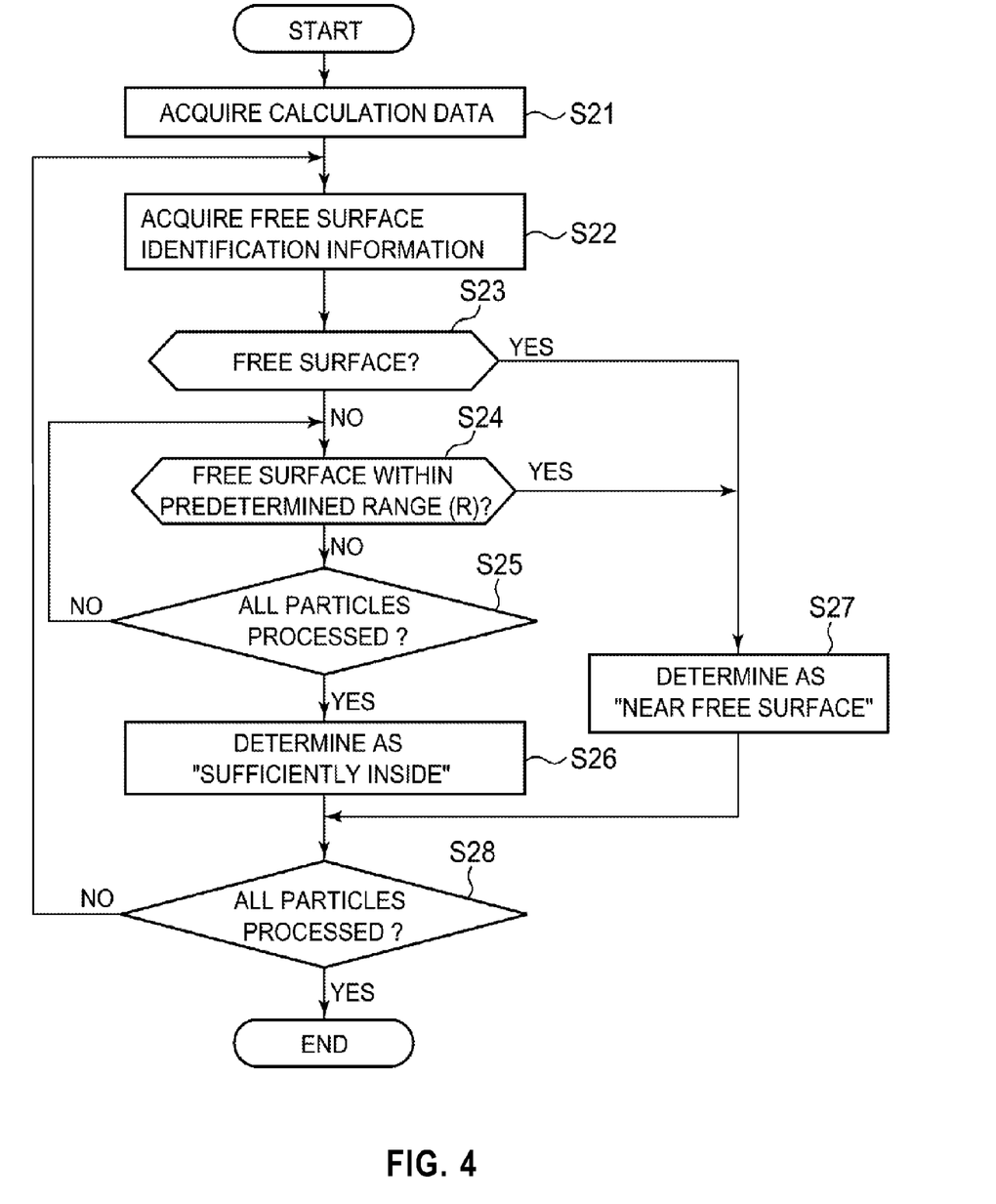
FIG. 4 is a flowchart showing a procedure of near free surface determination according to the embodiment of the present invention.

In more detail, step S2 is executed as a process shown in a flowchart in FIG. 4 described next.

In step S21, for the particle (i) or every particle, a position (x, y) and free surface identification information are acquired (by reading them with reference to the memory). In step S22, the free surface identification information of the particle (i) is acquired. In step S23, whether or not the free surface identification information of the particle (i) indicates "free surface" is determined.

The process goes to step S27 in the case where the free surface identification information indicates "free surface", and to step S24 in the case where the free surface identification information does not indicate "free surface".

In the case where the particle (i) is identified as a free surface particle, there is a high possibility that the particle (i) is also a free surface particle in the subsequent free surface setting. In step S24, first a distance between the particle (i) and another particle (j) is calculated from their respective positions (x, y). The distance between the particle (i) and the particle (j) is defined by the following expression (2).

$$\sqrt{(x_i-x_j)^2+(y_i-y_j)^2} \quad (2)$$

Here, $x_i$ and $y_i$ are x and y coordinates of the particle (i), whereas $x_j$ and $y_j$ are x and y coordinates of the particle (j). Free surface identification information of the particle (j) is referenced to in the case where the distance is determined as within the predetermined range R (the predetermined threshold stored in the memory), that is, in the case where the following expression (3) holds.

$$\sqrt{(x_i-x_j)^2+(y_i-y_j)^2} < R \quad (3)$$

Otherwise, the process goes to step S25. In the case where the free surface identification information of the particle (j) indicates "free surface", the process goes to step S27. Otherwise, the process goes to step S25.

When the particle (j) within the predetermined range with respect to the particle (i) is a free surface particle, the particle (i) exists near the free surface, and so there is a high possibility that the particle (i) itself becomes a free surface particle in the subsequent free surface setting step.

In step S25, whether or not the process of step S24 is completed for all particles (j) is determined for the particle (i). In the case where the process is not completed for all particles (j), the process returns to step S24. In the case where the process is completed for all particles (j), the process goes to step S26.

In step S26, a process of setting information "sufficiently inside" as near free surface identification information of the particle (i) is performed (the information can be stored in some memory). The process then goes to step S28. In step S27, a process of setting information "near free surface" as near free surface identification information of the particle (i) is performed.

The process then goes to step S28. In step S28, whether or not the near free surface identification information setting process is completed for all particles (i) is determined.

In the case where the process is not completed for all particles (i), the process returns to step S22. In the case where the process is completed for all particles (i), the whole near free surface setting process of step S2 is completed, and accordingly the process goes to step S3 (FIG. 3).

In steps S3 to S6, a force exerted on each particle by an external force or a viscosity is calculated, and a flow velocity (temporary velocity) and a position (temporary position) are calculated based on the calculated force (first stage calculation). The result of the first stage calculation can be stored in some memory, for use in second stage calculation.

The flow velocity and the position acquired at this stage are temporary, and corrected by the subsequent second stage calculation. Processes of these steps are already publicly known at the time of filing of the present application, and so their description is limited to brief description given in FIG. 2.

In step S7, a "particle number density" is calculated. A particle number density $n_i$ at the position of the particle (i) is calculated as a total sum of weight functions w of the other particles (j) for the particle (i). A process of this step is already publicly known at the time of filing of the present application, and so its description is limited to brief description given in FIG. 2.

In step S8, a free surface setting section 16 performs free surface determination, and sets free surface identification information. In this process, free surface determination is made for each particle using near free surface identification information and particle number density information.

As mentioned earlier, in the MPS method, a distribution of particles moving to temporary positions according to the first stage calculation typically has some degree of variation. This being so, at this stage, even a particle that is supposed to be positioned sufficiently inside often has a state of a lower particle number density.

There is a possibility that such a particle is erroneously determined as a free surface particle, if the conventional threshold determination based on the particle number density is applied to all particles. This causes a disturbance in the solution of Poisson's equation.

On the other hand, the present invention employs the near free surface identification information so that the threshold evaluation based on the particle number density for free surface determination is applied only to each particle that is either a free surface particle or is positioned near the free surface in a previous time step before the result of the first stage calculation.

Setting the previous time step to be closer to the immediately previous time step is expected to be more effective, because the behavior of the fluid is likely to have a fewer change. However, the present invention is not limited to such.

As a result, the above-mentioned erroneous determination that a particle that is supposed to be positioned sufficiently inside is a free surface particle can be fundamentally suppressed. In more detail, step S8 is executed as a process shown in a flowchart in FIG. 5 described next.

Figure 5:
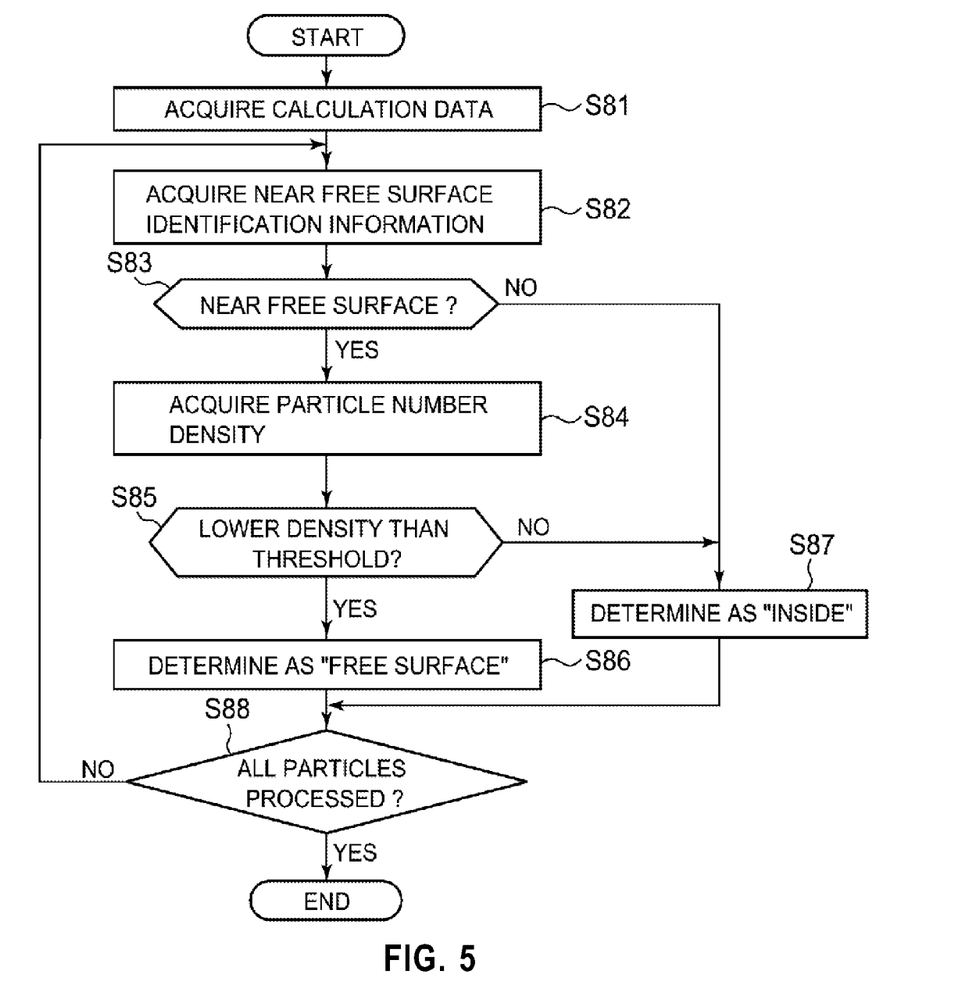
FIG. 5 is a flowchart showing a procedure of free surface determination according to the embodiment of the present invention.

In step S81, for a particle (i) or every particle, a position (x, y), a particle number density n, and near free surface identification information are acquired (by reading them with reference to the memory).

In step S82, the near free surface identification information of the particle (i) is acquired.

In step S83, whether the near free surface identification information of the particle (i) indicates "sufficiently inside" or "near free surface" is determined.

The process goes to step S87 in the case of "sufficiently inside", and to step S84 in the case of "near free surface". In step S84, the particle number density n of the particle (i) is acquired.

In step S85, whether or not the particle number density of the particle (i) is lower than a predetermined threshold is determined.

The process goes to step S86 in the case where the particle number density of the particle (i) is lower than the predetermined threshold, and to step S87 in the case where the particle number density of the particle (i) is not lower than the predetermined threshold.

In step S86, a process of setting information "free surface" as free surface identification information of the particle (i) is performed (the information can be stored in some memory).

The process then goes to step S88. In step S87, a process of setting information "inside" as free surface identification information of the particle (i) is performed. The process then goes to step S88. In step S88, whether or not the free surface identification information setting process is completed for all particles (i) is determined.

In the case where the process is not completed for all particles (i), the process returns to step S82. In the case where the process is completed for all particles (i), the whole free surface setting process of step S8 is completed, and accordingly the process goes to step S9 (FIG. 3).

In an incompressible fluid, the particle number density of each particle needs to be constant. However, the particle number density calculated in the distribution of each particle at the temporary position acquired by the above-mentioned first stage calculation typically has a variation.

In steps S9 to S11, a process of determining a pressure term using the solution of Poisson's equation and correcting the flow velocity and the position based on a force generated by this pressure gradient is performed in order to correct the variation to achieve a constant state.

Processes of these steps are already publicly known at the time of filing of the present application, and so their description is limited to brief description given in FIG. 2. In step S12, the time step is incremented (+dt) to proceed with the analysis.

In step S13, whether or not an analysis time is a calculation end time is determined. The process ends in the case where the analysis time is determined as the calculation end time, and returns to step S2 otherwise.

The present invention is not limited to the embodiment described above, and can be subjected to appropriate design changes. For example, the execution timing of step S2 in the flowchart can be appropriately changed by a person skilled in the art. Moreover, the free surface determination method according to the present invention is not limited to the MPS method, but is also applicable to other methods (e.g. the ISPH method) that require fluid free surface determination.

Furthermore, in the free surface determination method (step S8) using the near free surface identification information (step S2), the determination parts (steps S84, S85) based on the particle number density in the embodiment can be substituted by other determination parts within the scope of the present invention.

Figure 6:
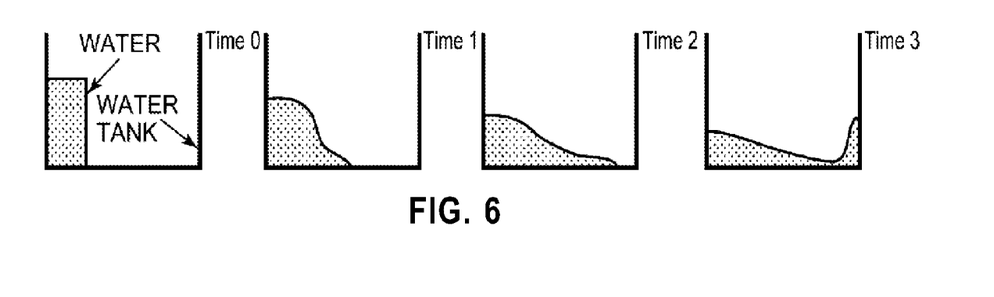
FIG. 6 is a diagram showing an outline of a simulation of a fluid behavior which is a two-dimensional dam break.

FIG. 6 is a diagram showing an outline of a simulation of a fluid behavior which is a two-dimensional dam break.

In brief, a phenomenon in which a water column placed at the left end flows rightward from the bottom as a result of gravity g (external force f) that exerts on the water column being converted to a pressure is simulated. Time 0, Time 1, Time 2, and Time 3 indicate respective states of the fluid behavior with time.

Figure 7A:
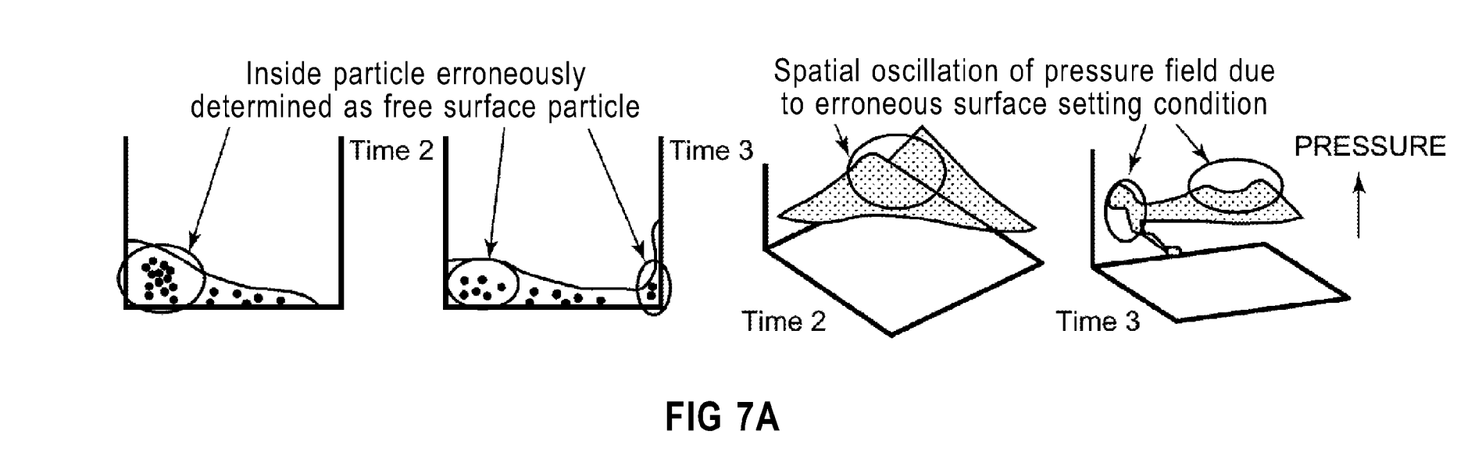
FIG. 7A is a diagram showing simulation results of a free surface particle distribution and a pressure distribution when the conventional technique is used.
Figure 7B:
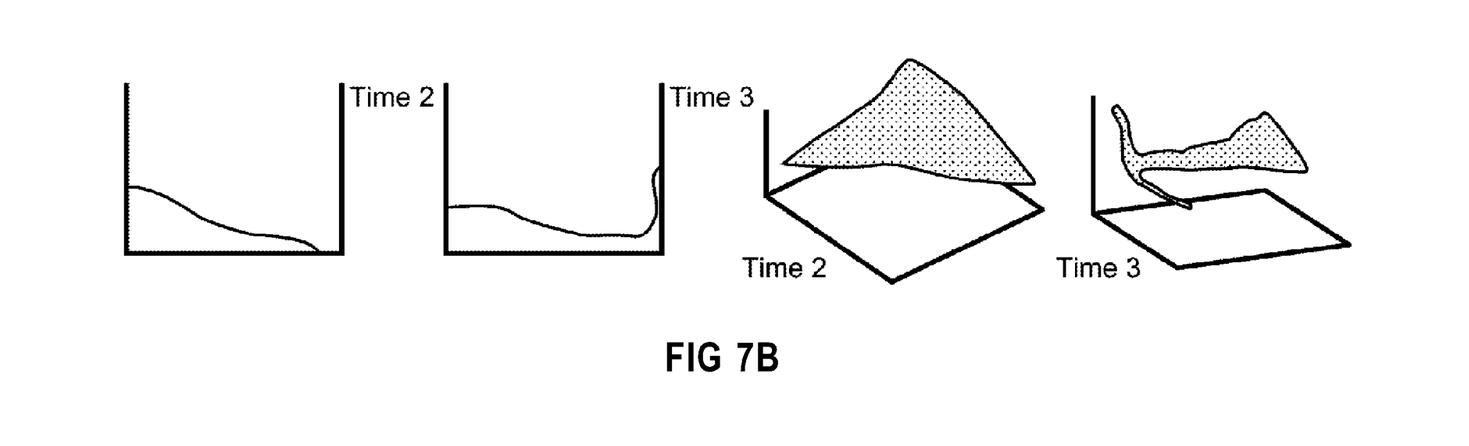
FIG. 7B is a diagram showing simulation results of a free surface particle distribution and a pressure distribution when the present invention is used.

FIG. 7A is a diagram showing simulation results of a free surface particle distribution and a pressure distribution when the conventional technique is used, and FIG. 7B is a diagram showing simulation results of a free surface particle distribution and a pressure distribution when the present invention is used.

In the conventional technique shown in FIG. 7A, inside particles erroneously determined as free surface particles and spatial oscillations of a pressure field due to erroneous surface setting conditions appear in Time 2 and Time 3. In comparison, the present invention shown in FIG. 7B achieves an effect of suppressing such defects, as can be seen from the drawing.

Figure 8:
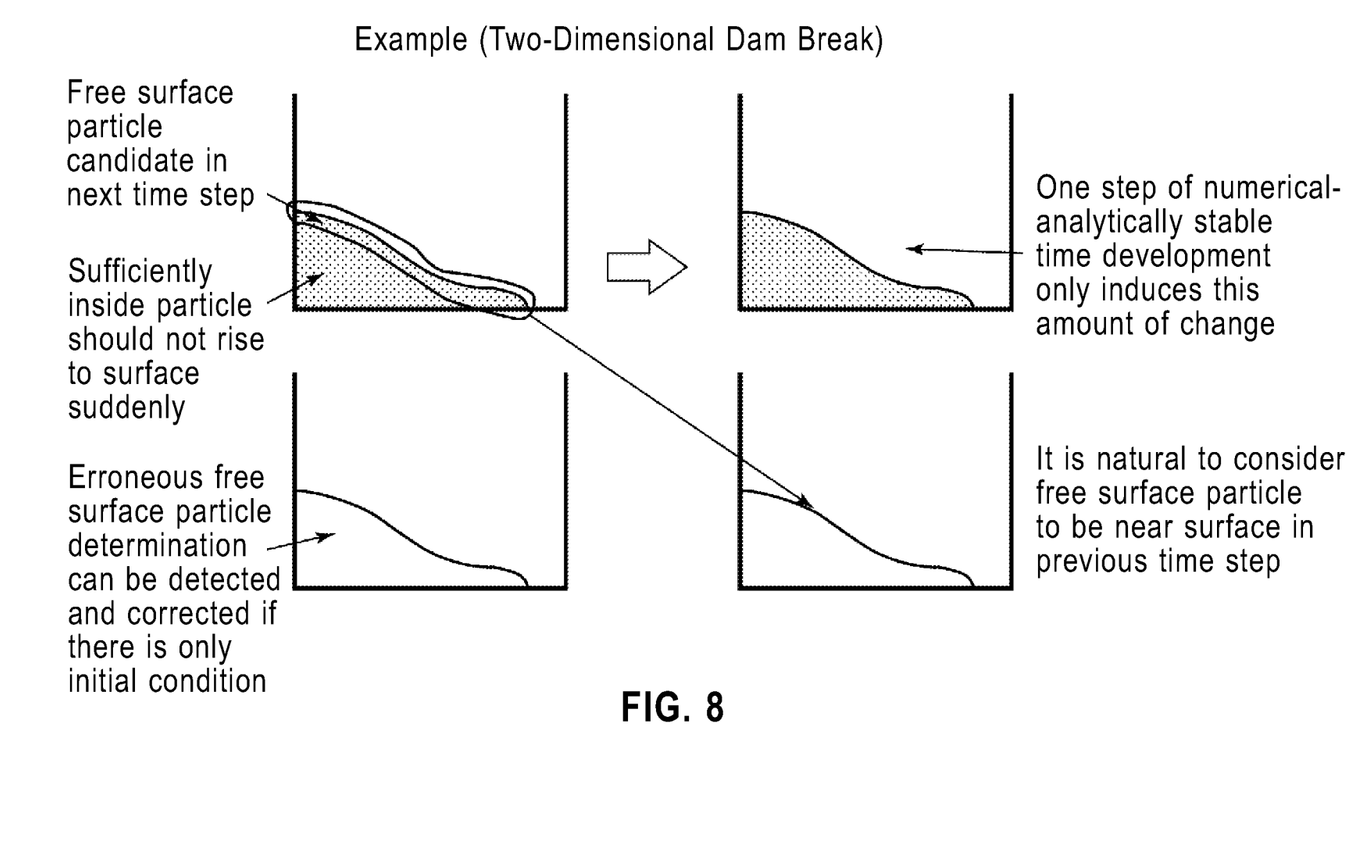
FIG. 8 is a schematic diagram showing from which portion a free surface particle candidate in the next time step is selected according to the present invention.

FIG. 8 is a schematic diagram showing from which portion a free surface particle candidate in the next time step is selected.

In the conventional technique, the particle number density of each particle is defined based on information of its surrounding particles, and the particle is determined as an inside particle in the case where the particle number density is high, and as a free surface particle in the case where the particle number density is low. On the other hand, the present invention has a feature of holding an index of each particle near the free surface and selecting a free surface particle in the next time step only from the held index.

What is claimed is:

1. An apparatus for determining whether or not a selected particle belongs to free surface particles, in a calculation process of a particle method in which a continuum subjected to calculation analysis is collectively modeled with a free surface by a plurality of particles, the apparatus comprising:
    a processor configured to:
    determine a near free surface identification information for a selected particle base on whether or not a particle belonging to the free surface exists within a predetermined range of the selected particle by referencing free surface identification information stored in a memory in a previous time step in the calculation process;
    store in the memory the determined near free surface identification information for the selected particle;
    perform a first stage of a time step of the calculation process using the determined near free surface identification information of the selected particle, wherein a position and flow velocity are calculated for the selected particle due to an external force in the first stage;
    determine a free surface identification information for the selected particle after the first stage when the near free surface identification information for the selected particle indicates that the particle belonging to the free surface exists prior to the first stage and based on a particle number density for the selected particle after the first stage;
    store the determined free surface identification information in the memory; and
    perform a second stage of the time step of the calculation process using the determined free surface identification information of the selected particle, wherein the second stage corrects the position and flow velocity of the selected particle for a force generated by a pressure gradient.

2. The apparatus according to claim 1, wherein the processor is further configured to perform the steps of determination and storing for all of the plurality of particles of the continuum subjected to the calculation analysis.

3. The apparatus according to claim 1, wherein the processor is further configured to store, in the memory, free surface identification information which is set as "inside" when the particle is determined as sufficiently inside by referencing the near free surface identification information stored in the memory, wherein the free surface identification information is stored for reference in a subsequent time step.

4. The apparatus according to claim 3, wherein the processor is further configured to:
    compare a particle number density associated with the selected particle with a predetermined particle number density threshold when the selected particle is determined as near free surface by referencing the near free surface identification information stored in the memory; and
    store in the memory, based on the comparison, free surface identification information as "free surface" when the particle number density is lower than the predetermined particle number density threshold and as "inside" when the particle number density is not lower than the predetermined particle number density threshold, wherein the free surface identification information is stored for reference in a subsequent time step.

* * * * *